(12) United States Patent
Roberts et al.

(10) Patent No.: US 9,900,658 B2
(45) Date of Patent: Feb. 20, 2018

(54) DEVICE CONTEXT-BASED METHODS AND SYSTEMS FOR PROVIDING A PERSONALIZED INTERACTION EXPERIENCE WITH A MEDIA SERVICE

(71) Applicant: Verizon and Redbox Digital Entertainment Services, LLC, Basking Ridge, NJ (US)

(72) Inventors: Brian F. Roberts, Dallas, TX (US); Imran Arif Maskatia, Palo Alto, CA (US); Anthony Lemus, Irving, TX (US)

(73) Assignee: Verizon and Redbox Digital Entertainment Services, LLC, Basking Ridge, NJ (US)

( * ) Notice: Subject to any disclaimer, the term of this patent is extended or adjusted under 35 U.S.C. 154(b) by 258 days.

(21) Appl. No.: 14/973,704

(22) Filed: Dec. 17, 2015

(65) Prior Publication Data

US 2016/0105720 A1   Apr. 14, 2016

Related U.S. Application Data

(63) Continuation of application No. 14/069,302, filed on Oct. 31, 2013, now Pat. No. 9,245,019.

(51) Int. Cl.
*H04N 21/466* (2011.01)
*G06F 17/30* (2006.01)
*G06Q 30/02* (2012.01)
*H04N 21/258* (2011.01)
*H04N 21/482* (2011.01)
*H04N 21/6547* (2011.01)
(Continued)

(52) U.S. Cl.
CPC ... *H04N 21/4661* (2013.01); *G06F 17/30781* (2013.01); *G06Q 30/0255* (2013.01); *H04L 67/327* (2013.01); *H04N 21/252* (2013.01); *H04N 21/25808* (2013.01); *H04N 21/25866* (2013.01); *H04N 21/4532* (2013.01); *H04N 21/4667* (2013.01); *H04N 21/4668* (2013.01); *H04N 21/4788* (2013.01); *H04N 21/482* (2013.01); *H04N 21/6547* (2013.01)

(58) Field of Classification Search
USPC ........................................................ 715/717
See application file for complete search history.

(56) References Cited

U.S. PATENT DOCUMENTS 8,307,029 B2   11/2012  Davis et al.
8,402,356 B2    3/2013  Martinez et al.
(Continued)

*Primary Examiner* — William Titcomb

(57) ABSTRACT

A system detects a first activity performed by a first user with respect to a media service while the first user is logged in to the media service with a particular user account and a second activity performed by a second user with respect to the media service while the second user is logged in to the media service with the particular user account, determines that the first activity is performed within a first device context and that the second activity is performed within a second device context, includes, based on the determination, the first activity in a local activity set associated with the first device context, the local activity set including one or more activities performed with respect to the media service exclusively in the first device context, and uses the local activity set to provide a personalized interaction experience with the media service within the first device context.

20 Claims, 11 Drawing Sheets

(51) Int. Cl.
*H04L 29/08* (2006.01)
*H04N 21/25* (2011.01)
*H04N 21/45* (2011.01)
*H04N 21/4788* (2011.01)

(56) References Cited

U.S. PATENT DOCUMENTS

| | | |
|---|---|---|
| 9,245,019 B2 * | 1/2016 | Roberts ............ G06F 17/30781 |
| 2008/0120665 A1 | 5/2008 | Relyea et al. |
| 2008/0301186 A1 | 12/2008 | Svendsen |
| 2009/0177644 A1 | 7/2009 | Martinez et al. |
| 2009/0327305 A1 | 12/2009 | Roberts et al. |
| 2009/0327739 A1 | 12/2009 | Relyea et al. |
| 2010/0030740 A1 | 2/2010 | Higgins et al. |
| 2010/0082515 A1 | 4/2010 | Relyea et al. |
| 2010/0083169 A1 | 4/2010 | Athsani et al. |
| 2010/0083190 A1 | 4/2010 | Roberts et al. |
| 2013/0061154 A1 | 3/2013 | Bennett |
| 2013/0073400 A1 | 3/2013 | Heath |
| 2014/0365349 A1 | 12/2014 | Kennon |

* cited by examiner

DEVICE CONTEXT-BASED METHODS AND SYSTEMS FOR PROVIDING A PERSONALIZED INTERACTION EXPERIENCE WITH A MEDIA SERVICE

RELATED APPLICATIONS

This application is a continuation application of U.S. patent application Ser. No. 14/069,302, filed Oct. 31, 2013, and entitled "Device Context-Based Methods and Systems for Providing a Personalized Interaction Experience with a Media Service", which is hereby incorporated by reference in its entirety.

BACKGROUND INFORMATION

There are diverse ways for people to find and consume media programs. For example, a person wanting to watch a movie may utilize a traditional video distribution service such as a video rental or purchase service ("video service") to find, access, and watch a movie. The video service may allow the person to rent or purchase a physical copy of the movie from a local video store or video vending kiosk, or to rent or purchase a digital copy of the movie through an online video service, which may stream or download the digital copy of the movie to a user computing device for playback to the user.

Such a video service typically provides a user of the service with tools for discovering video programs offered for access through the video service. For example, a video service may provide a user with a tool (e.g., a web-based interface, a client application, etc.) that the user may use to log in to the video service in order to browse through video programs provided by the video service, access (e.g., view, download, purchase, and/or rent) video programs provided by the video service, and/or otherwise interact with the video service. Activities performed by the user with respect to the video service may be tracked while the user is logged in to the video service in order to provide the user with a personalized interaction experience with the video service. For example, a viewing history of the user may be tracked in order to provide one or more personalized recommendations to the user while the user is logged in to the video service.

Unfortunately, one user's activities with respect to the video service may "pollute" a personalized interaction experience provided to another user of the video service if both users access the video service using the same user account. This is because conventional video services do not differentiate between the activities performed by the various users of the same user account when providing one of those users with a personalized interaction experience. For example, a child may log in to a video service with a user account shared by members of the child's family. While logged in to the video service, the child may use the video service to watch multiple episodes of a children's program (e.g., a program entitled "Barney"). Subsequently, the child's parent may log in to the video service using the same user account. Based on the viewing history generated by the child, the parent may be presented with recommendations for other children's programming similar to the children's program accessed by the child instead of recommendations for programs in which the parent is likely interested.

Some video services attempt to address this pollution problem by allowing users to switch between different user profiles within the same user account. Activity performed within each user profile may then be tracked and used to provide personalized interaction experiences within each user profile. Unfortunately, this requires users to proactively ensure that they are logged into the correct user profile. It also sacrifices the benefits of shared content discovery among the users.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
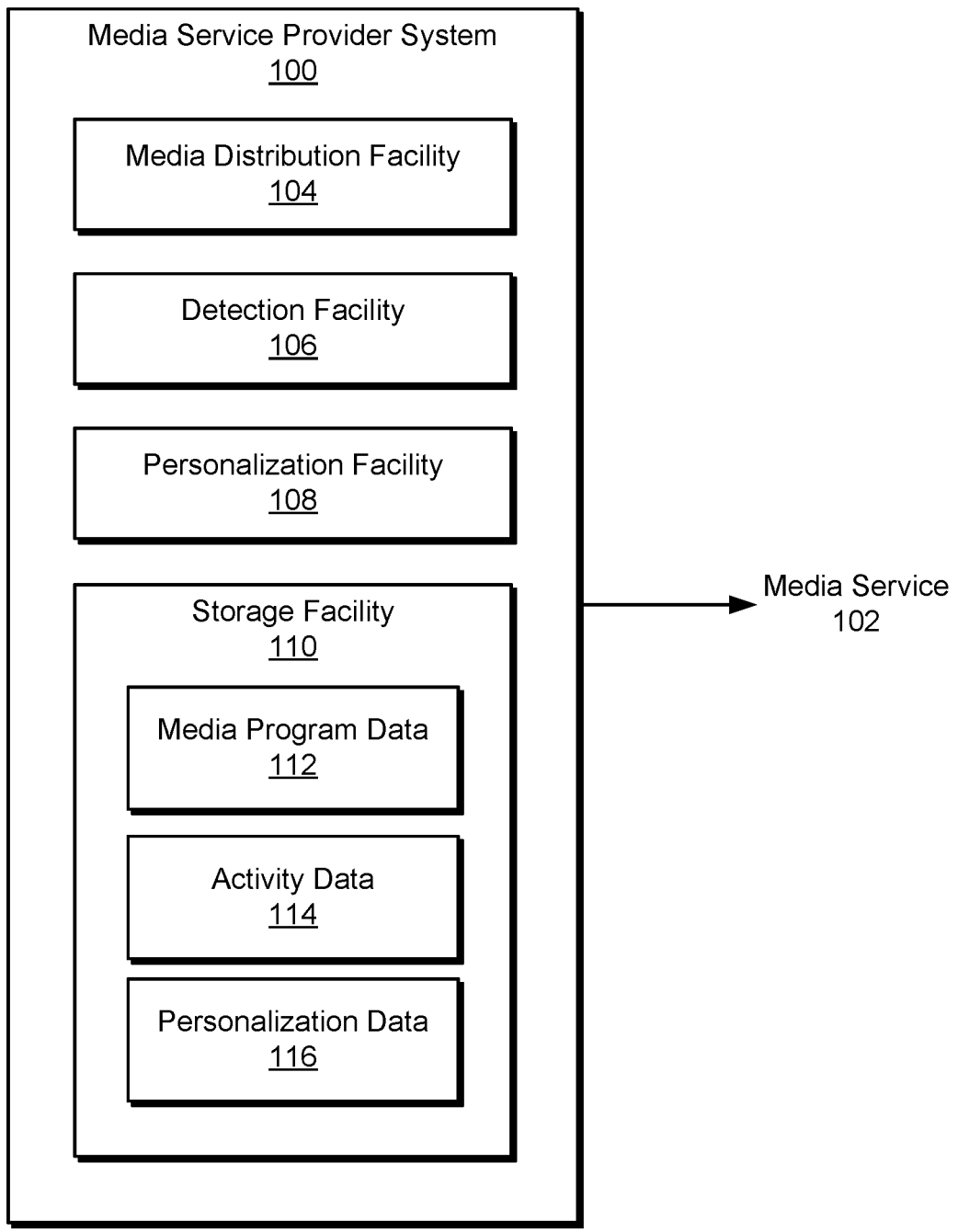
FIG. 1 illustrates an exemplary media service provider system according to principles described herein.

Device context-based methods and systems for providing a personalized interaction experience with a media service. As will be described below, a media service provider system may detect a first activity performed by a first user with respect to a media service while the first user is logged in to the media service with a particular user account and a second activity performed by a second user with respect to the media service while the second user is logged in to the media service with the particular user account, determine that the first activity is performed within a first device context and that the second activity is performed within a second device context, include, based on the determination, the first activity in a local activity set associated with the first device context, the local activity set including one or more activities performed with respect to the media service exclusively in the first device context, and use the local activity set to provide a personalized interaction experience with the media service within the first device context.

To illustrate, a first user may use a first user device (e.g., a mobile computing device) to log in to a media service (e.g., a video-on-demand ("VOD") content service, such as RED-BOX INSTANT, NETFLIX, or any other subscription-based VOD content service) with a particular user account. While logged in to the media service, the first user may perform a first activity with respect to the media service (e.g., by watching a first media program provided by the media service by way of the first user device). While the first user is logged in to the media service (or at any other time), a second user may use a second user device (e.g., a television device) to log in to the same media service using the same user account used by the first user. While logged in to the media service, the second user may perform a second activity (e.g., by watching a second media program provided by the media service by way of the second user device).

The media service provider system described herein may determine that the first activity is performed with the first user device and that the second activity is performed with the second user device. Based on this determination, the media service provider system may include the first activity in a local activity set associated with the first user device (e.g., by including data representative of the first activity in the local activity set). Likewise, the media service provider system may include the second activity in a local activity set associated with the second user device. However, as will be described below, the media service provider system may exclude the second activity from the local activity set associated with the first user device and the first activity from the local activity set associated with the second user device. The local activity set associated with the first user device may then be used to provide a personalized interaction experience with the media service for a user (e.g., the first user) who accesses the media service by way of the first user device using the user account. Likewise, the local activity set associated with the second user device may be used to provide a personalized interaction experience with the media service for a user (e.g., the second user) who accesses the media service by way of the second user device using the user account.

By excluding the second activity from the local activity set associated with the first user device, the second activity is prevented from polluting (e.g., contributing to) the personalized interaction experience provided by way of the first user device. Likewise, by excluding the first activity from the local activity set associated with the second user device, the first activity is prevented from polluting (e.g., contributing to) the personalized interaction experience provided by way of the second user device. This may benefit end users and/or a provider of the media service. For example, the methods and systems described herein may enhance user experiences with discovery of media programs of the media service without requiring multiple users of the same user account to interact with the media service using different user profiles.

FIG. 1 illustrates an exemplary media service provider system 100 ("system 100"). System 100 may be configured to facilitate discovery, access, and/or consumption of media programs by one or more users. For example, system 100 may be configured to provide a media service 102 (also referred to as a "media program distribution service") to one or more end users of the media service 102 (e.g., one or more subscribers to the media service 102). System 100 may be associated with (e.g., operated by) a provider of the media service 102 ("service provider"). Through the media service 102, an end user of the media service may discover, access, and/or consume media programs distributed by system 100.

In certain examples, the media service 102 may be an integrated media service at least because the media service 102 distributes media programs by way of multiple different media distribution models, thus providing an end user of the media service 102 with access to media programs by way of multiple different media distribution models. Examples of media distribution models associated with the media service 102 are described herein.

As used herein, the term "media program" may refer to any discrete instance of media content that may be distributed by the media service 102 for consumption by an end user of the media service 102. For example, a media program may refer to any television program, on-demand media program, pay-per-view media program, broadcast media program (e.g., broadcast television program), multicast media program (e.g., multicast television program), narrowcast media program (e.g., narrowcast video-on-demand program), Internet Protocol television ('IPTV") media program, advertisement, video, movie, audio program, radio program, video game, or any other media program that a user may access by way of the media service 102. Such media programs that are made available for user consumption by way of the media service 102 may be accessed and/or played back by an appropriately configured user computing device (e.g., a media player device) for presentation to the user.

As shown in FIG. 1, system 100 may include, without limitation, a media distribution facility 104 ("distribution facility 104"), a detection facility 106, a personalization facility 108, and a storage facility 110 selectively and communicatively coupled to one another. The facilities may be communicatively coupled one to another by any suitable communication technologies.

It will be recognized that although facilities 104-110 are shown to be separate facilities in FIG. 1, any of those facilities may be combined into a single facility or split into additional facilities as may serve a particular implementation. Additionally or alternatively, one or more of the facilities 104-110 may be omitted from and external to system 100 in other implementations. Facilities 104-110 will now be described in more detail.

Storage facility 110 may be configured to store media program data 112 representative of media programs that may be distributed by distribution facility 104, activity data 114 representative of activities performed by one or more users with respect to the media service 102, and personalization data 116 generated and/or used by personalization facility 108 to provide one or more personalized interaction experiences for one or more end users of the media service 102. Storage facility 110 may maintain additional or alternative data as may serve a particular implementation.

Distribution facility 104 may be configured to distribute media programs to users of the media service 102. Distribution facility 104 may be configured to distribute media programs in any way and/or form that is suitable to facilitate consumption of the media programs by users of the media service 102.

In certain examples, distribution facility 104 may be configured to distribute media programs by way of one or more different media program distribution channels. For example, distribution facility 104 may be configured to distribute media programs by way of a digital media distribution channel and/or a physical media distribution channel. The digital media distribution channel may include on-demand streaming and/or downloading of data representative of the media programs from a media service provider server system to one or more user computing systems by way of a network (e.g., an Internet Protocol ("IP") wide area network such as the Internet). The physical media distribution channel may include distribution of physical media that hold data representative of the media programs. For example, the physical media distribution channel may include a media vending kiosk-based distribution channel through which physical media, such as digital versatile discs ("DVDs"), BLU-RAY discs, and/or other physical computer-readable copies of media programs are distributed to users of the media service 102.

Figure 2:
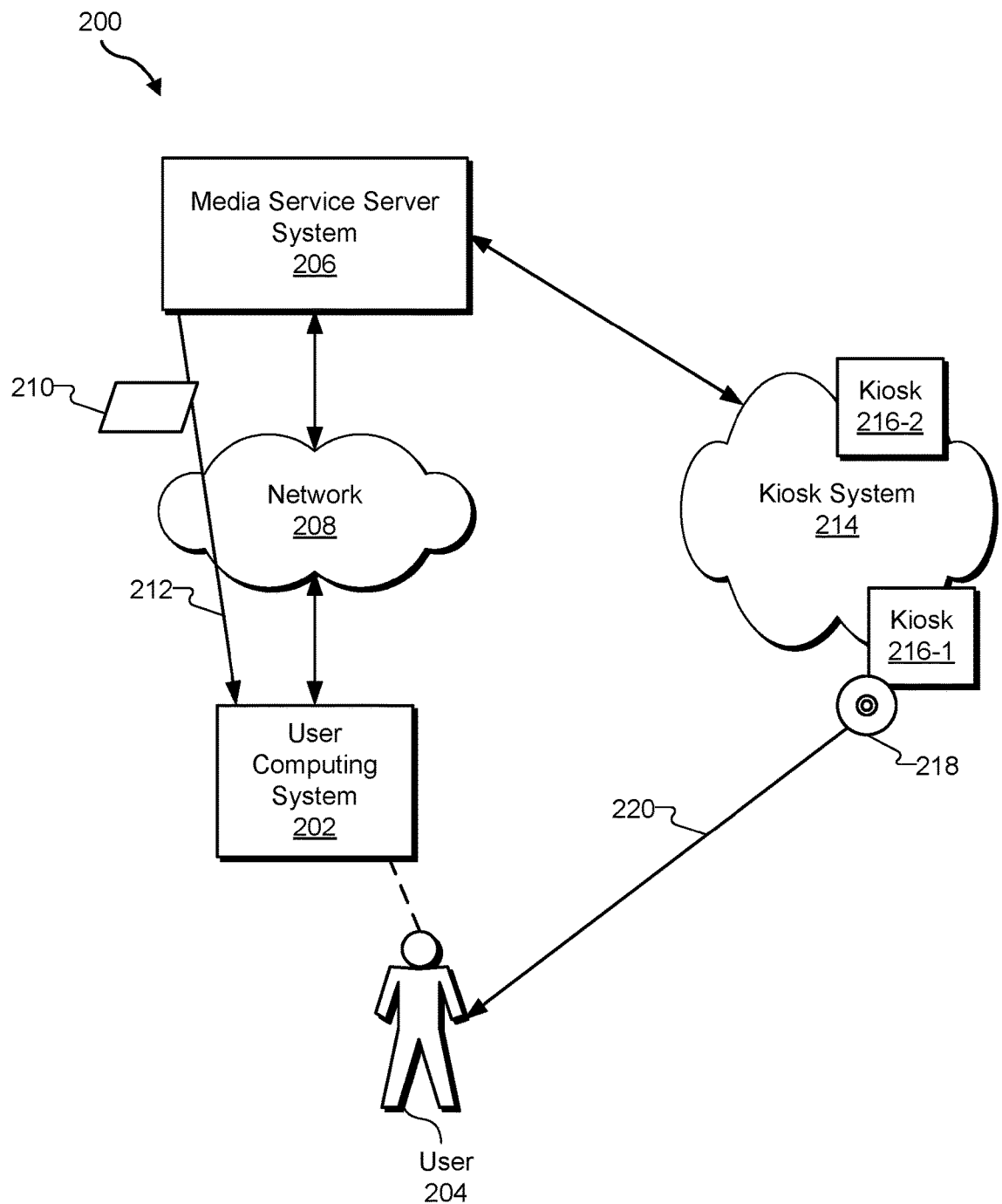
FIG. 2 illustrates an exemplary media programs distribution configuration according to principles described herein.

FIG. 2 illustrates an exemplary media programs distribution configuration 200 ("configuration 200") in which system 100 is implemented. Components of system 100 may be implemented by one or more of the elements of the configuration 200 shown in FIG. 2. As shown, the configuration 200 may include a user computing system 202 associated with a user 204, who may be an end user of the media service 102. User computing system 202 may be in communication with a media service server system 206 ("server system 206"), which may include one or more computing devices (e.g., server devices) remotely located from user computing system 202 and/or operated by a provider of the media service 102.

User computing system 202 and server system 206 may communicate using any communication platforms and technologies suitable for transporting data (e.g., media program data) and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, Internet communication technologies, media streaming technologies, media download technologies, and other suitable communications technologies.

In certain embodiments, user computing system 202 and server system 206 may communicate via a network 208. Network 208 may include one or more networks, such as one or more wireless networks (Wi-Fi networks), wireless communication networks, mobile telephone networks (e.g., cellular telephone networks), closed media networks, open media networks, closed communication networks, open communication networks, wide area networks (e.g., the Internet), local area networks, and any other networks capable of carrying data (e.g., streaming and/or downloading media programs) and/or communications signals between user computing system 202 and server system 206. Communications between user computing system 202 and server system 206 may be transported using any one of the above-listed networks, or any combination or sub-combination of the above-listed networks. Alternatively, user computing system 202 and server system 206 may communicate in another way such as by direct connections between user computing system 202 and server system 206.

The configuration 200 may support distribution of media programs, through the media service 102, by way of multiple different media distribution channels, such as a digital media distribution channel and a physical media distribution channel. As shown, server system 206 may distribute media programs such as digital data 210 representative of a media program to user computing system 202 by way of a digital media distribution channel 212. This distribution may utilize any suitable media streaming and/or downloading technologies (e.g., Internet media streaming and/or downloading technologies) to support delivery of digital data representative of media programs to user computing system 202 by way of network 208.

As further shown in FIG. 2, server system 206 may be in communication with a media vending kiosk system 214, which may include one or more geographically distributed vending kiosks 216 (e.g., vending kiosks 216-1 and 216-2) configured to vend physical copies of media programs, such as a physical copy 218 of a media program, to user 204 by way of a physical media distribution channel 220. For example, user 204 may visit a location of media vending kiosk 216-1 and obtain the physical copy 218 of the media program from the media vending kiosk 216-1. In certain examples, one or more of the vending kiosks 216 may include automated media vending machines.

The user computing system 202 may be configured for use by the user 204 to access the media service 102 provided by system 100. For example, the user 204 may utilize the user computing system 202 to access one or more user interfaces provided by system 100 as part of the media service 102, and to present the user interfaces for use by the user 204 to discover, access, and/or consume media programs distributed by way of the digital media distribution channel 212 and/or the physical media distribution channel 220 as part of the media service 102.

The user computing system 202 may include one or more user computing devices associated with the user 204. Examples of such devices include, without limitation, a media player computing device (e.g., a media disc player device such as a DVD or BLU-RAY disc player device), a display device, a set-top box device, a digital video recording ("DVR") device, a computer, a tablet computer, a smart phone device, a gaming console, and any other device capable of accessing the media service 102 and/or media programs provided by system 100 by way of the media service 102.

In certain examples, the user computing system 202 may include a first user computing device (e.g., a primary display device) configured to play back media programs and a second user computing device (e.g., a secondary or companion display device) configured to display a graphical user interface that may compliment or be used together with the playback of the media programs by the first user computing device. For instance, a television may provide a primary display screen on which a video program may be displayed, and a tablet computer may provide a secondary display screen on which a graphical user interface (e.g., a graphical user interface related to the video program, the playback of the video program, and/or the media service 102) may be displayed. Such an example is illustrative only. Other examples of user computing system 202 may include any combination of user computing devices or a single user computing device configured to perform any of the user computing system and/or device operations described herein.

Returning to FIG. 1, in certain examples, distribution facility 104 may be configured to provide users of the media service 102 with access to media programs by way of one or more different media distribution models ("distribution models"). Each distribution model may define a particular way that an end user of the media service 102 may gain access to media programs through the media service 102. Thus, a user of the media service 102 may be able to gain access to media programs by way of multiple different distribution models.

In certain examples, the distribution models may include multiple distribution channel-based models such as a digital media distribution model that corresponds to a digital media distribution channel and a physical media distribution model that corresponds to a physical media distribution channel. For example, a digital media programs distribution model may include and/or utilize the digital media distribution channel 212 of FIG. 2, and a physical media distribution model may include or utilize the physical media distribution channel 220 of FIG. 2.

Additionally or alternatively, the distribution models may include different compensation-based models for gaining access to media programs. For example, the distribution models may include one or more subscription-based distribution models and one or more transactional-based distribution models. A subscription-based distribution model may be defined by a service provider to provide a user with access to certain media programs based on a subscription of the user to the media service 102 (e.g., a monthly-fee subscription, a temporary free-trial subscription, or another defined subscription). A transactional-based distribution model may be defined by a service provider to provide a user with access to certain media programs based on discrete transactions dedicated to accessing specific media programs. For example, access to a media program may be provided in exchange for a fee dedicated to a rental or a purchase of the media program. The conditions of the access may be defined to be different for a rental and a purchase of the media program, in which case each of the rental and the purchase may be a different transactional-based distribution model (e.g., a media rental distribution model and a media purchase distribution model).

In certain examples, the distribution models may include different models that are combinations of channel-based distribution models and compensation-based distribution models. For example, the different models may include one or more of a subscription-based and digital channel-based distribution model, a transactional-based and digital channel-based distribution model, a subscription-based and physical channel-based distribution model, and a transactional-based and physical channel-based distribution model.

Figure 3:
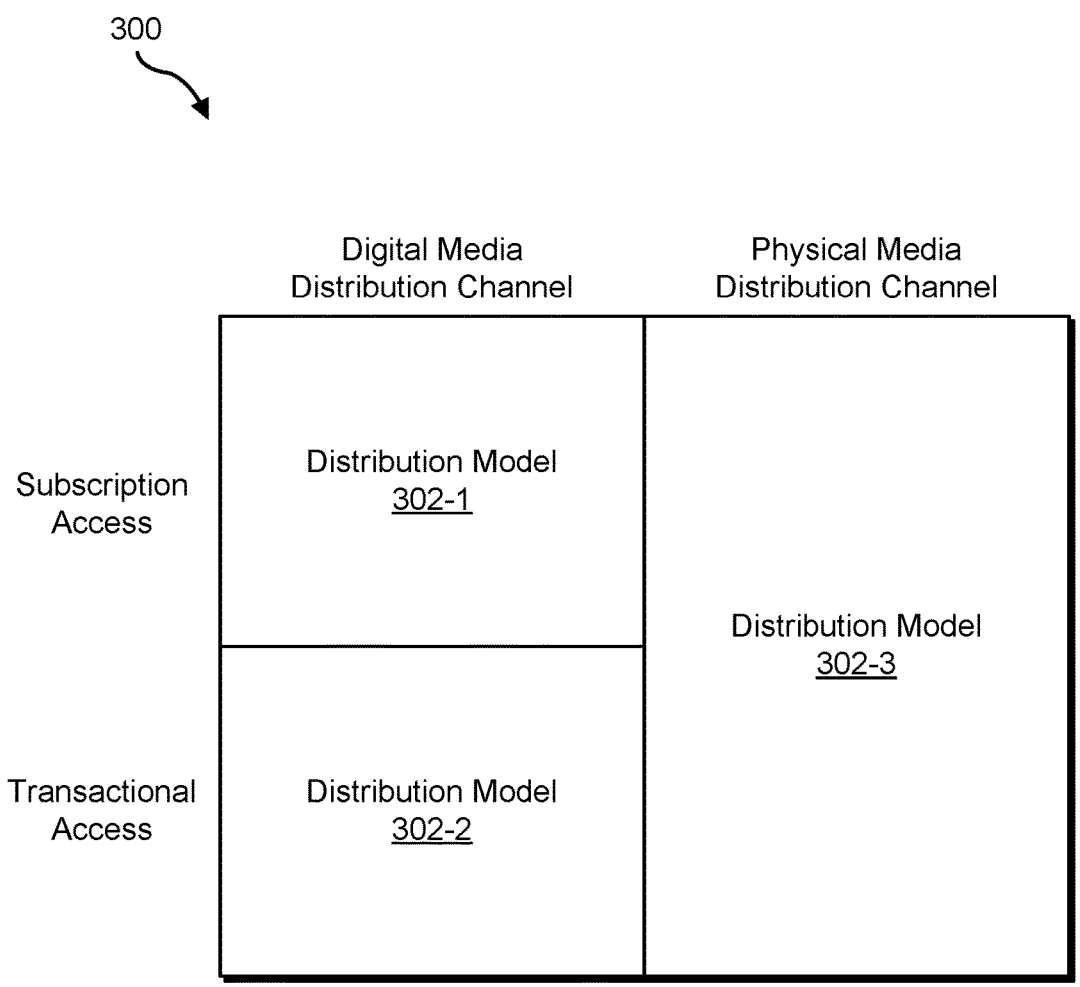
FIG. 3 illustrates a table representing an exemplary set of different media distribution models by way of which access to media programs may be provided by way of a media service according to principles described herein.

Distribution facility 104 may be configured to provide users of the media service 102 with access to media programs by way of any of the different distribution models described herein, or by way of any combination or sub-combination thereof. As an example, FIG. 3 illustrates a table 300 representing a set of different distribution models by way of which access to media programs may be provided through the media service 102 in certain implementations. As shown, the set of distribution models includes a first distribution model 302-1 associated with subscription-based access to media programs by way of a digital media distribution channel, a second distribution model 302-2 associated with transactional-based access to media programs by way of the digital media distribution channel, and a third distribution model 302-3 associated with either or both subscription-based or transactional-based access to media programs by way of a physical media distribution channel. In certain examples, these distribution models 302 may be referred to as a "subscription" digital distribution model 302-1, an "on-demand" or "rent/buy" digital distribution model 302-2, and a "physical" or "kiosk" distribution model 302-3.

Media programs distributed by distribution facility 104 as part of the media service 102 may be assigned to one or more of the distribution models provided by distribution facility 104. For example, certain media programs may be made available by way of all of the distribution models and certain media programs may be made available by way of only a subset of the distribution models (e.g., by way of only a subscription-based and digital channel-based distribution model, only a transactional-based and digital channel-based distribution model, only a physical channel-based distribution model, only a transactional-based distribution model, etc.).

In certain examples, assignments of media programs to distribution models may change over time. For example, for a first period of time, a media program may be distributed by way of distribution model 302-3 only. At the end of that period of time, the media program may leave distribution model 302-3, meaning that the media program is no longer accessible by way of distribution model 302-3. For a second period of time, however, the same media program may be distributed by way of distribution model 302-2 only. For example, when the media program leaves distribution model 302-3, the media program may be added to distribution model 302-2. At the end of the second period of time, the same media program may leave distribution model 302-2 and be assigned to distribution model 302-1. This example is illustrative only, a media program may be made accessible by way of different distribution models or specific combinations of distribution models for specific periods of time, and may be added to or removed from any distribution model in any suitable way.

Distribution facility 104 may maintain and/or otherwise have access to data representing relationships between media programs and distribution models by way of which the media programs are distributed. Such data may indicate to which distribution models the media programs are assigned and periods of time for the assignments (e.g., periods of time during which media programs are assigned to the distribution models). This data may be maintained in any suitable way, including in distinct source catalogues respectively associated with the distribution models, in an integrated catalogue associated with all of the distribution models (e.g., an integrated catalogue that includes an aggregation of non-redundant data included in the source catalogues), or a combination of such source catalogues and an integrated catalogue.

Returning again to FIG. 1, detection facility 106 may be configured to detect activities performed by a plurality of different users with respect to media service 102 while the users are logged in to media service 102 with the same user account. As used herein, a user may perform an "activity" with respect to a media service by accessing a media program distributed by the media service (e.g., by renting, purchasing, streaming, downloading, viewing, or otherwise selecting the media program), creating a playlist within the media service, creating a channel within the media service (e.g., a VOD channel), rating a media program distributed by the media service, and/or or otherwise interacting with one or more features of the media service.

Each activity performed by a user with respect to a media service may be performed within a particular device context. As used herein, a "device context" refers to a particular user device and/or device-specific user account used to perform an activity with respect to a media service.

Figure 4:
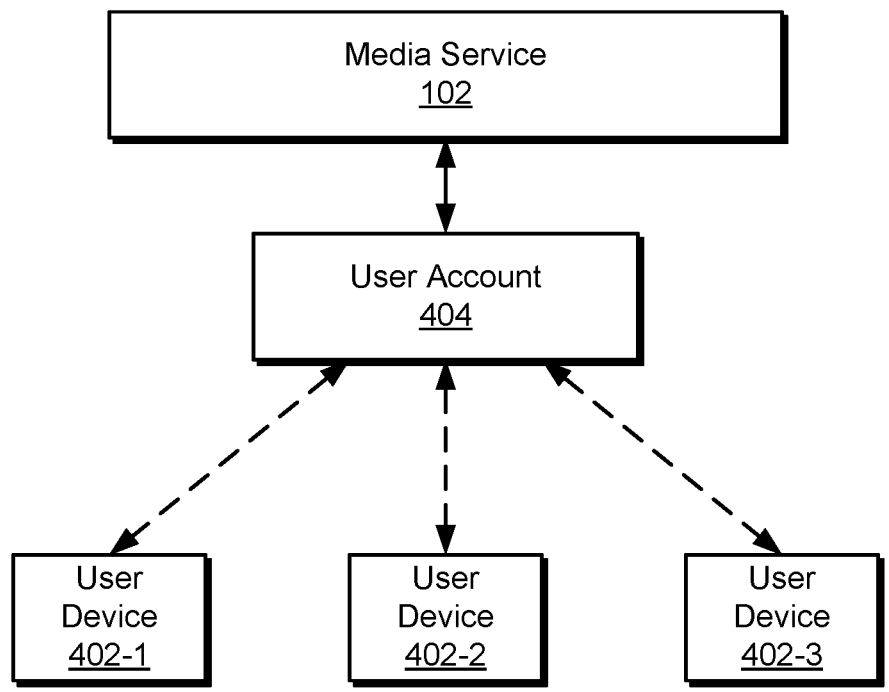
FIG. 4 shows an exemplary scenario in which one or more users may perform one or more activities with respect to a media service within different device contexts according to principles described herein.

To illustrate, FIG. 4 shows an exemplary scenario in which one or more users may perform one or more activities with respect to media service 102 within different device contexts. As shown, multiple user devices 402 (e.g., user device 402-1 through user device 402-3) may use the same user account 404 to access media service 102. User account 404 may include any data and/or service that allows a user to access media service 102. For example, user account 404 may include data representative of access credentials (e.g., login information) that may be used by one or more users to access media service 102.

Each user device 402 may include any suitable combination of computing devices. For example, each user device 402 may include, without limitation, a media player computing device (e.g., a media disc player device such as a DVD or BLU-RAY disc player device), a display device, a set-top box device, a DVR device, a computer, a mobile device (e.g., a tablet computer or a mobile phone), a gaming console, and/or any other device capable of accessing the media service 102 and/or media programs provided by system 100 by way of the media service 102.

In some examples, different users may utilize user devices 402 to access media service 102 with user account 404. For example, multiple users within a particular household may utilize multiple user devices 402 to access media service 102 with user account 404. In some examples, an individual user may also utilize multiple user devices 402 to access media service 102 with user account 404.

In the example of FIG. 4, a user that uses user device 402-1 to access media service 102 may perform one or more activities with respect to media service 102 within a first device context associated with user device 402-1. Likewise, a user that uses user device 402-2 to access media service 102 may perform one or more activities with respect to media service 102 within a second device context associated with user device 402-2, and a user that uses user device 402-3 to access media service 102 may perform one or more activities with respect to media service 102 within a third device context associated with user device 402-3. In this manner, multiple users may perform activities with respect to media service 102 in different device contexts using the same user account 404.

Figure 5:
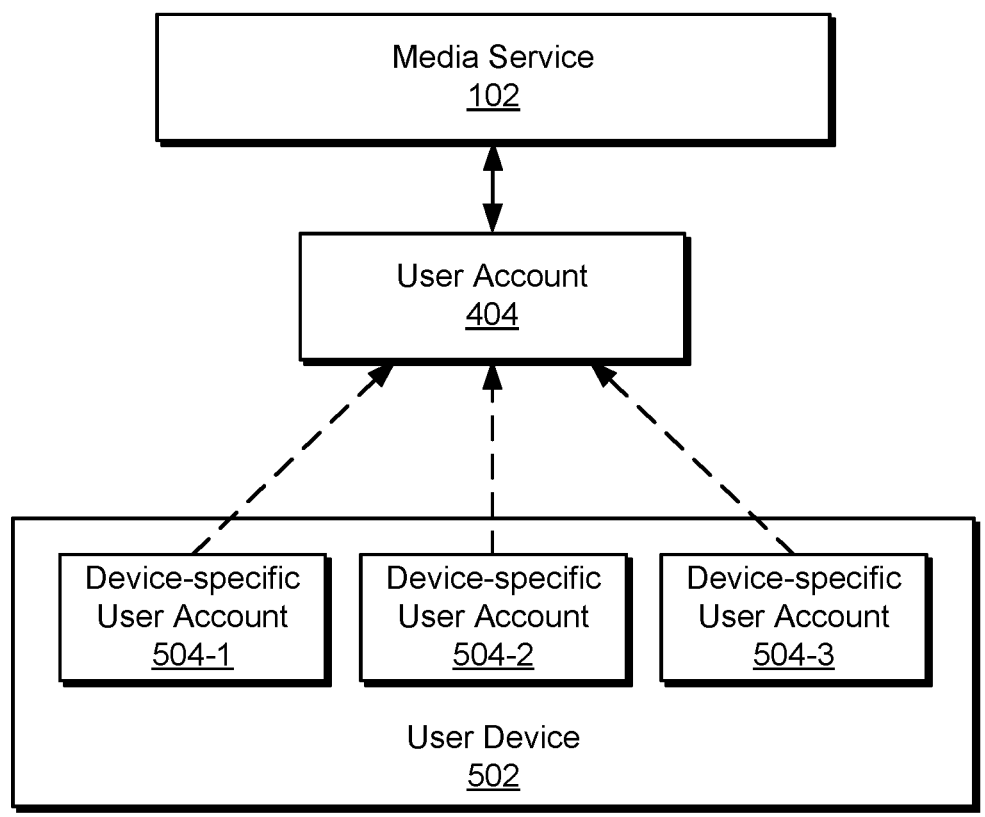
FIG. 5 shows another exemplary scenario in which one or more users may perform one or more activities with respect to a media service within different device contexts according to principles described herein.

FIG. 5 shows another exemplary scenario in which one or more users may perform one or more activities with respect to media service 102 within different device contexts. As shown, a single user device 502 may include multiple device-specific user accounts 504 (e.g., device-specific user account 504-1 through device-specific user account 504-3). Each device-specific user account 504 may correspond to a particular user of user device 502. For example, a first user may log in to and interact with user device 502 utilizing device-specific user account 504-1, a second user may log in to and interact with user device 502 utilizing device-specific user account 504-2, and a third user may log in to and interact with user device 502 utilizing device-specific user account 504-3. An exemplary implementation of user device 502 is a gaming console.

In some examples, each user of user device 502 may use the same user account 404 to access media service 102, regardless of the particular device-specific user account 504 used to access user device 502. For example, a first user may log in to user device 502 utilizing device-specific user account 504-1 and then use user device 502 to access media service 102 with user account 404. A second user may likewise log in to user device 502 utilizing device-specific user account 504-2 and then use user device 502 to access media service 102 with the same user account 404. In this manner, the first user may perform one or more activities with respect to media service 102 within a first device context associated with device-specific user account 504-1 and the second user may perform one or more activities with respect to media service 102 within a second device context associated with device-specific user account 504-2.

Returning again to FIG. 1, personalization facility 108 may be configured to provide one or more personalized interaction experiences with media service 102 to one or more users within various device contexts. To this end, personalization facility 108 may identify device contexts in which activities are performed with respect to media service 102. Personalization facility 108 may then use the identified device contexts to provide the one or more personalized interaction experiences.

For example, detection facility 106 may detect a first activity performed by a first user with respect to media service 102 while the first user is logged in to the media service 102 with a particular user account. Detection facility 106 may also identify a second activity performed by a second user (which, in some examples, may be the same user as the first user) with respect to media service 102 while the second user is logged into the media service 102 with the same user account. In this example, personalization facility 108 may determine that the first activity is performed within a first device context and that the second activity is performed within a second device context.

This determination may be performed in any suitable manner. For example, personalization facility 108 may determine that the first activity is performed by the first user with a first user device (e.g., user device 402-1) and that the second activity is performed by the second user with a second user device (e.g., user device 402-2) physically distinct from the first user device. Alternatively, personalization facility 108 may determine that the first activity is performed by the first user with a user device (e.g., user device 502) while the first user is logged in to the user device with a first device-specific user account (e.g., device-specific user account 504-1) and that the second activity is performed by the second user with the same user device while the second user is logged in to the user device with a second device-specific user account (e.g., device-specific user account 504-2) that is different than the first device-specific user account.

Based on the determination that the first activity is performed within the first device context and that the second activity is performed within the second device context, personalization facility 108 may include the first activity in a local activity set associated with the first device context. This may be performed in any suitable manner. For example, personalization facility 108 may include data representative of the first activity in data representative of the local activity set associated with the first device context. Personalization facility 108 may also exclude (i.e. not include) the second activity from the local activity set associated with the first device context based on the determination that the second activity is performed within the second device context. In some examples, personalization facility 108 may similarly include the second activity in a local activity set associated with the second device context while excluding the first activity from the local activity set associated with the second device context.

As used herein, a "local activity set" associated with a particular device context refers to a log of activities performed with respect to media service 102 exclusively in the particular device context. Hence, the local activity set associated with the first device context includes activities performed with respect to the media service 102 exclusively in the first device context. Personalization facility 108 may accordingly use the local activity set associated with the first device context to provide a personalized interaction experience with the media service 102 within the first device context. The personalized interaction experience may be provided to any user who interacts with media service 102 within the first device context.

Personalization facility 108 may use the local activity set associated with the first device context to provide a personalized interaction experience with the media service 102 in any suitable manner. For example, personalization facility 108 may use the activities included in the local activity set associated with the first device context to generate one or more recommendations associated with content provided by the media service 102 and present the one or more recommendations within an interface associated with the media service 102 to a user (e.g., the first user and/or any other user) while the user interacts with the media service 102 within the first device context using the particular user account.

To illustrate, the first user may perform the first activity with respect to the media service 102 by watching a media program distributed by the media service 102 within the first device context while the first user is logged in to the media service 102 with the particular user account. Personalization facility 108 may accordingly include the media program in a group of media programs watched within the first device context and use the group of media programs to generate one or more recommendations for other media programs distributed by the media service 102 that are related in some way to one or more of the media programs included in the group of media programs. The one or more recommendations may then be presented within an interface associated with the media service 102 (e.g., an interface that facilitates user interaction with the media service 102) to a user (e.g., the first user and/or any other user) who interacts with the media service 102 within the first device context using the particular user account. By excluding the second activity (e.g., a watching by the second user of a different media program distributed by the media service 102) from the local activity set associated with the first device context, personalization 108 may prevent the second activity from polluting the one or more recommendations presented within the first device context.

As another example, personalization facility 108 may use the activities included in the local activity set associated with the first device context to generate an access history (e.g., a watch history, a download history, a rental history, a purchase history, etc.) representative of one or more media programs included in the media programs and accessed by way of the media service 102 within the first device context. Personalization facility 108 may then present the access history within an interface associated with the media service 102 to a user while the user interacts with the media service 102 within the first device context using the particular user account.

To illustrate, the first user may perform the first activity with respect to the media service 102 by watching a media program distributed by the media service 102 within the first device context while the first user is logged in to the media service 102 with the particular user account. Personalization facility 108 may accordingly include the media program in a watch history and present the watch history within an interface associated with the media service 102 (e.g., an interface that facilitates user interaction with the media service 102) to a user (e.g., the first user and/or any other user) while the user interacts with the media service 102 within the first device context using the particular user account. By excluding the second activity (e.g., a watching by the second user of a different media program distributed by the media service 102) from the local activity set associated with the first device context, personalization 108 may prevent the second activity from being included in the watch history presented within the first device context.

As another example, the first activity may include a creation of a channel within the media service 102. In this example, personalization facility 108 may provide the personalized interaction experience within the first device context by providing a user (e.g., the first user and/or any other user) with access to the channel while the user interacts with the media service 102 within the first device context using the particular user account. However, a channel created by the second user within the second device context may not be presented within the first device context.

In some examples, it may be desirable to provide an additional personalized interaction experience that is not exclusively based on the device context being used by the user to access media service 102. For example, a user may desire to be presented with a personalized interaction experience that is based on activities performed with respect to media service 102 within multiple device contexts. This type of personalized interaction experience will be referred to herein as a "shared interaction experience."

To this end, personalization facility 108 may maintain a shared activity set that includes activities performed by one or more users with respect to the media service 102 in a plurality of different device contexts while the one or more users are logged in to the media service 102 with the particular user account. The shared activity set may be maintained in any suitable manner. For example, the shared activity set may be maintained by maintaining data representative of the activities included in the shared activity set. The shared activity set may be used by personalization facility 108 to provide a shared interaction experience with the media service 102 within any of the plurality of different device contexts.

For example, referring again to the example in which the first and second activities are performed within the first and second device contexts, respectively, personalization facility 108 may include both the first activity and the second activity in a shared activity set. The first and second activities may then be used, together with the other activities included in the shared activity set, to provide the shared interaction experience with the media service 102 within the first and/or second device context.

To illustrate, the first user may perform the first activity with respect to the media service 102 by watching a first media program distributed by the media service 102 within the first device context while the first user is logged in to the media service 102 with the particular user account. The second user may likewise perform the second activity with respect to the media service 102 by watching a second media program distributed by the media service 102 within the second device context while the second user is logged in to the media service 102 with the particular user account. Personalization facility 108 may include both the first and second activities within a shared activity set and then use the shared activity set to generate one or more recommendations associated with content provided by the media service 102. The one or more recommendations based on the shared activity set may then be presented by way of an interface associated with the media service 102 to the first and second users while the first and second users interact with the media service 102 within the first and second device context using the particular user account.

In some examples, personalization facility 108 may allow a user interacting with media service 102 within a particular device context to switch between a "local mode" in which a personalized interaction experience is presented to the user that is based exclusively on activities performed within the particular device context and a "shared mode" in which a shared interaction experience is presented to the user that is based on activities performed within a plurality of different device contexts.

Figure 6:
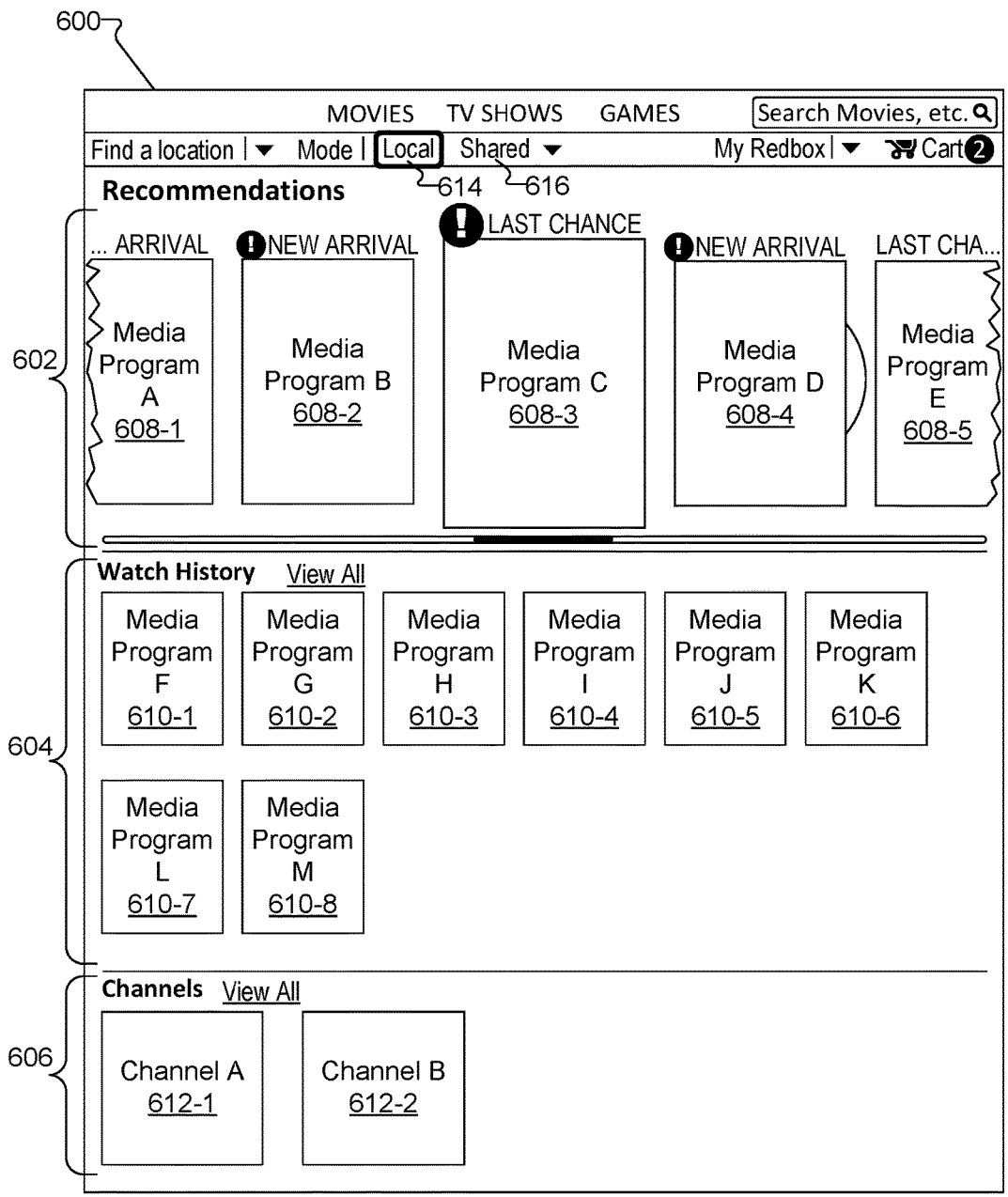
FIGS. 6-8 show an exemplary interface associated with a media service that may be provided according to principles described herein.

To illustrate, FIG. 6 shows an exemplary interface 600 associated with media service 102 and that may be presented to a user while the user is logged in to the media service 102 within a particular device context. Interface 600 may be displayed on a display screen included within or otherwise associated with the device context. As shown, interface 600 may include a recommendations section 602, a watch history section 604, and a channels section 606. As will be described below, the contents of each section may depend on whether the user has selected a local mode or a shared mode.

As shown, recommendations section 602 may include a plurality of media program recommendations represented by a plurality of graphical objects 608 (e.g., graphical objects 608-1 through 608-5). Each graphical object 608 may include a cover art image and/or any other suitable representation of a media program included in the media program recommendations. In the particular example of FIG. 6, recommendations section 602 includes recommendations for five media programs labeled "Media Program A" through "Media Program E".

Watch history section 604 may include graphical objects 610-1 through 610-8 (collectively "graphical objects 610") representative of media programs included in a watch history representative of media programs at least partially watched by one or more users of a particular user account associated with the media service 102. In the particular example of FIG. 6, watch history section 604 includes eight media programs labeled "Media Program F" through "Media Program M".

Channels section 606 includes graphical objects 612-1 and 612-2 (collectively "graphical objects 612") representative of channels created by one or more users of a particular user account associated with the media service 102. In the particular example of FIG. 6, channels section 606 includes two channels labeled "Channel A" and "Channel B".

FIG. 6 shows that interface 600 may further include an option 614 for the media service 102 to operate in a local mode and an option 616 for the media service 102 to operate in a shared mode. A user may provide user input representative of a request for media service 102 to operate in the local mode by selecting option 614. Likewise, the user may provide user input representative of a request for media service 102 to operate in the shared mode by selecting option 616.

FIG. 6 shows that the user has selected the local mode option 614. While the local mode option 614 is selected in a particular device context, personalization facility 108 may include all activities performed with respect to the media service 102 within the particular device context in a local activity set associated with the particular device context. Personalization facility 108 may use the local activity set to provide a personalized interaction experience with the media service 102 within the particular device context while the local mode option 614 is selected. For example, because the local mode option 614 is selected in FIG. 6, each media program and channel shown in sections 602, 604, and 606 of interface 600 has been selected by personalization facility 108 for inclusion in interface 600 based exclusively on activities performed within the particular device context being used to access the media service 102.

Figure 7:
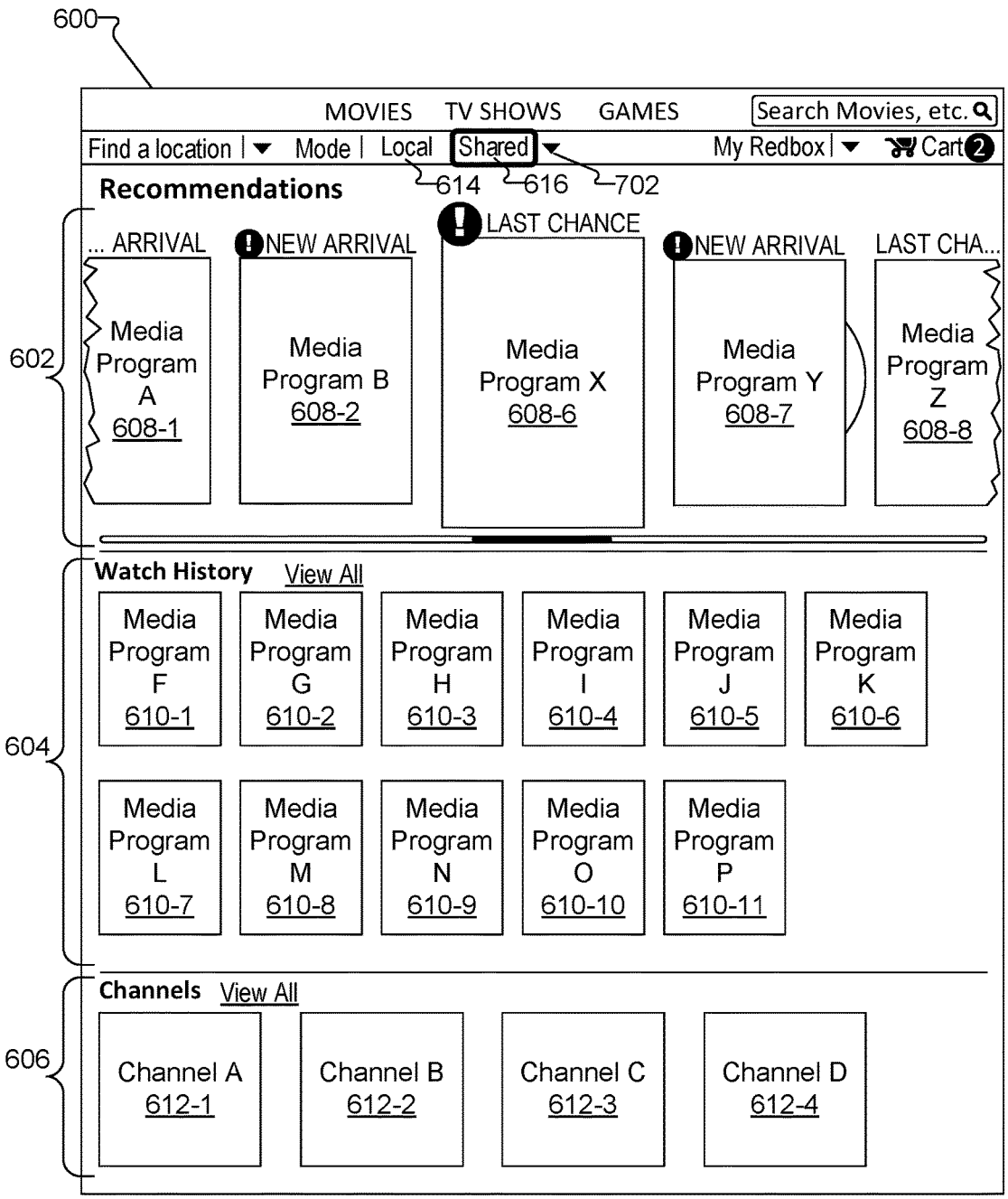

The user may subsequently select the shared mode option 616 to switch to the shared mode. In response, personalization facility 108 may provide a shared interaction experience by updating and/or changing the content of interface 600 to include content that has been selected based on a shared activity set associated with a plurality of device contexts used to access the media service 102 with the same user account. For example, FIG. 7 shows interface 600 after the user has selected the shared mode option 616. As shown, media programs labeled "Media Program X," "Media Program Y," and "Media Program Z" and represented by graphical objects 608-6 through 608-8 are now included in recommendations section 602, media programs labeled "Media Program N," "Media Program O," and "Media Program P" and represented by graphical objects 610-9 through 610-11 are now included in watch history section 604, and channels labeled "Channel C" and "Channel D" and represented by graphical objects 612-3 and 612-4 are not included in channels section 606. It will be recognized that interface 600 may be personalized in any other suitable manner in response to user selection of the shared mode option 616.

In some examples, personalization facility 108 may automatically include activities performed by the user with respect to the media service 102 while the shared mode option 616 is selected in the shared activity set used to provide the shared interaction experience. These activities may also be included in the local activity set associated with the particular device context being used by the user to access the media service 102. In this manner, the activities may be used to provide a personalized interaction experience based exclusively on the activities performed within the particular device context if the user subsequently selects the local mode option 614.

Figure 8:
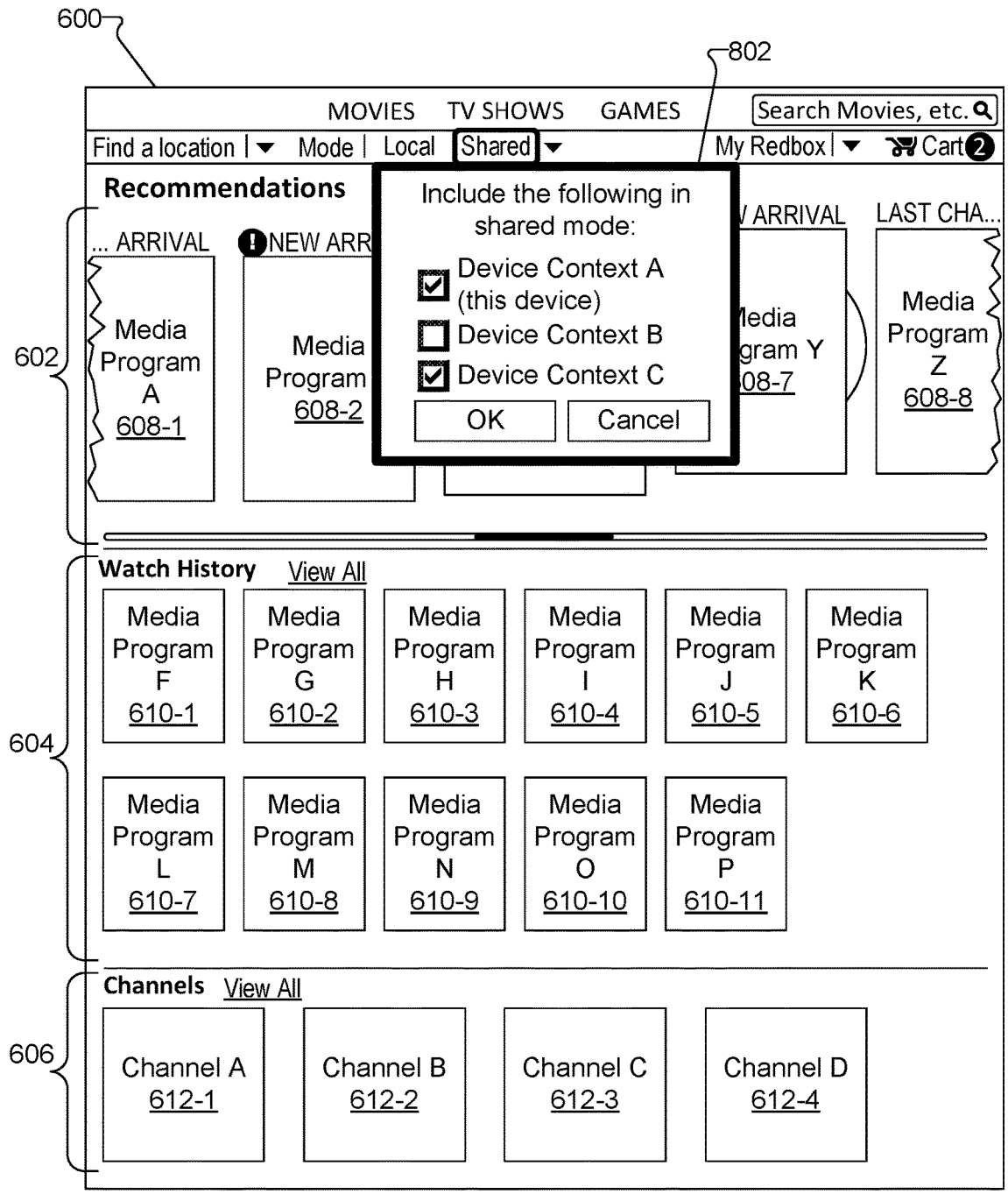

In some examples, personalization facility 108 may allow a user to select which device contexts are included in the shared mode. To this end, FIG. 7 shows that personalization facility 108 may present an option 702 that the user may select in order to select one or more device contexts for inclusion in the shared mode. FIG. 8 shows interface 600 after the user has selected option 702. As shown, a menu 802 may be displayed within interface 600 in response to a user selection of option 702. Menu 802 may include a list of device contexts used to interact with the media service 102 using the same user account. The user may select one or more of the device contexts for inclusion in the shared mode. For example, FIG. 8 shows that the user has selected a device context labeled "Device Context A" and a device context labeled "Device Context C" for inclusion in the shared mode. In response, personalization facility 108 may use local activity sets associated with the selected device contexts to provide a shared interactive experience with media service 102 (e.g., by customizing the content displayed within interface 600).

In some examples, personalization facility 108 may allow a user to experience one or more features of a personalized interaction experience associated with a particular device context even if the user is interacting with media service 102 in a different device context. For example, the user may create a channel within the media service 102 while interacting with the media service 102 in a first device context while the local mode option 614 is selected. Hence, the channel may not be available to the user when the user subsequently interacts with the media service 102 in a second device context. In this scenario, personalization facility 108 may provide an option within the second device context for the user to access one or more features of the personalized interaction experience provided in the first device context. Personalization facility 108 may detect a selection by the user of the option and, in response, provide the user with access to the one or more features of the personalized interaction experience provided in the first device context. This may be performed in any suitable manner.

For example, with reference again to FIG. 8, the user may be accessing the media service 102 within a device context labeled "Device Context A". To access one or more features of a personalized interaction experience provided in a device context labeled "Device Context C", the user may select the device context labeled "Device Context C" shown in menu 802 and unselect all of the other device contexts shown in menu 802. In response, personalization facility 108 may update and/or change interface 600 to include content based exclusively on an activity set associated with the device context labeled "Device Context C". In this manner, the user may be provided with access to one or more features of the device context labeled "Device Context C" while accessing the media service 102 within the device context labeled "Device Context A".

In some examples, a user may designate certain activities performed while the local mode option 614 is selected for inclusion in the shared activity set. For example, a user may create a channel within a particular device context while the local mode option 614 is selected. The user may subsequently desire to access the channel in a different device context. To this end, the user may select an option to share the channel (i.e., include the channel in the shared activity set that is used to provide a shared interaction experience within any device context that accesses the media service 102 with the same user account). This option may be provided and selected in any suitable manner.

In some examples, personalization facility 108 may allow a user to share information representative of an activity performed with respect to the media service 102 with a social network service (e.g., FACEBOOK, TWITTER, etc.) using a social network account associated with the user, even if the user account being used to access the media service 102 is linked to a social network account associated with a different user.

To illustrate, a first user may desire to share a channel that he or she creates with respect to the media service 102 within a first device context with a social network service (e.g., by posting a link to the channel to his or her FACEBOOK page). However, the user account that the first user uses to access the media service 102 may be linked to a second user's social network account.

To facilitate the sharing of the channel by the first user with the social network service without requiring the user to unlink the user account from the second user's social network account, personalization facility 108 may detect that the first user is interacting with the media service 102 within the first device context and, in response, determine that the first device context is linked to a social network account provided by the social network service and associated with the first user. This determination may be performed in any suitable manner. For example, personalization facility 108 may determine that an application (e.g., a "mobile app") associated with the social network service is installed on a user device being used by the user to access the media service 102 and that the application has been linked to the social network account associated with the first user. Based on this determination, personalization facility 108 may override the link between the user account and the second user's social network account to share the channel with the social network service using the social network account associated with the first user.

Figure 9:
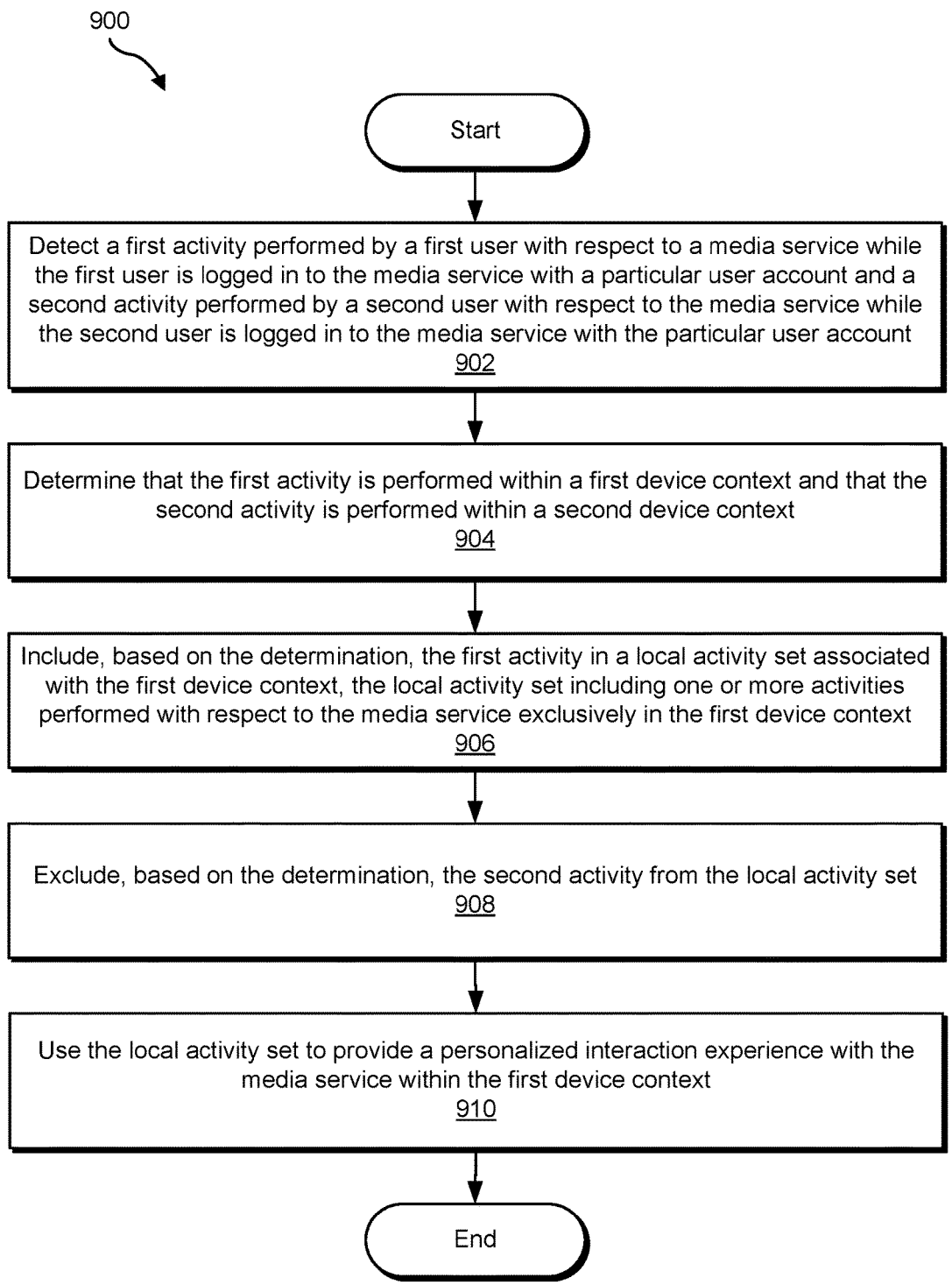
FIG. 9 illustrates an exemplary device context-based method of providing a personalized interaction experience with a media service according to principles described herein.

FIG. 9 illustrates an exemplary device context-based method 900 of providing a personalized interaction experience with a media service. While FIG. 9 illustrates exemplary steps according to one embodiment, other embodiments may omit, add to, reorder, and/or modify any of the steps shown in FIG. 9. One or more of the steps shown in FIG. 9 may be performed by system 100 and/or any implementation thereof.

In step 902, a media service provider system detects a first activity performed by a first user with respect to a media service while the first user is logged in to the media service with a particular user account and a second activity performed by a second user with respect to the media service while the second user is logged in to the media service with the particular user account. Step 902 may be performed in any of the ways described herein.

In step 904, the media service provider system determines that the first activity is performed within a first device context and that the second activity is performed within a second device context. Step 904 may be performed in any of the ways described herein.

In step 906, the media service provider system includes, based on the determination, the first activity in a local activity set associated with the first device context, the local activity set including one or more activities performed with respect to the media service exclusively in the first device context. Step 906 may be performed in any of the ways described herein.

In step 908, the media service provider system excludes, based on the determination, the second activity from the local activity set. Step 908 may be performed in any of the ways described herein.

In step 910, the media service provider system uses the local activity set to provide a personalized interaction experience with the media service within the first device context. Step 910 may be performed in any of the ways described herein.

Figure 10:
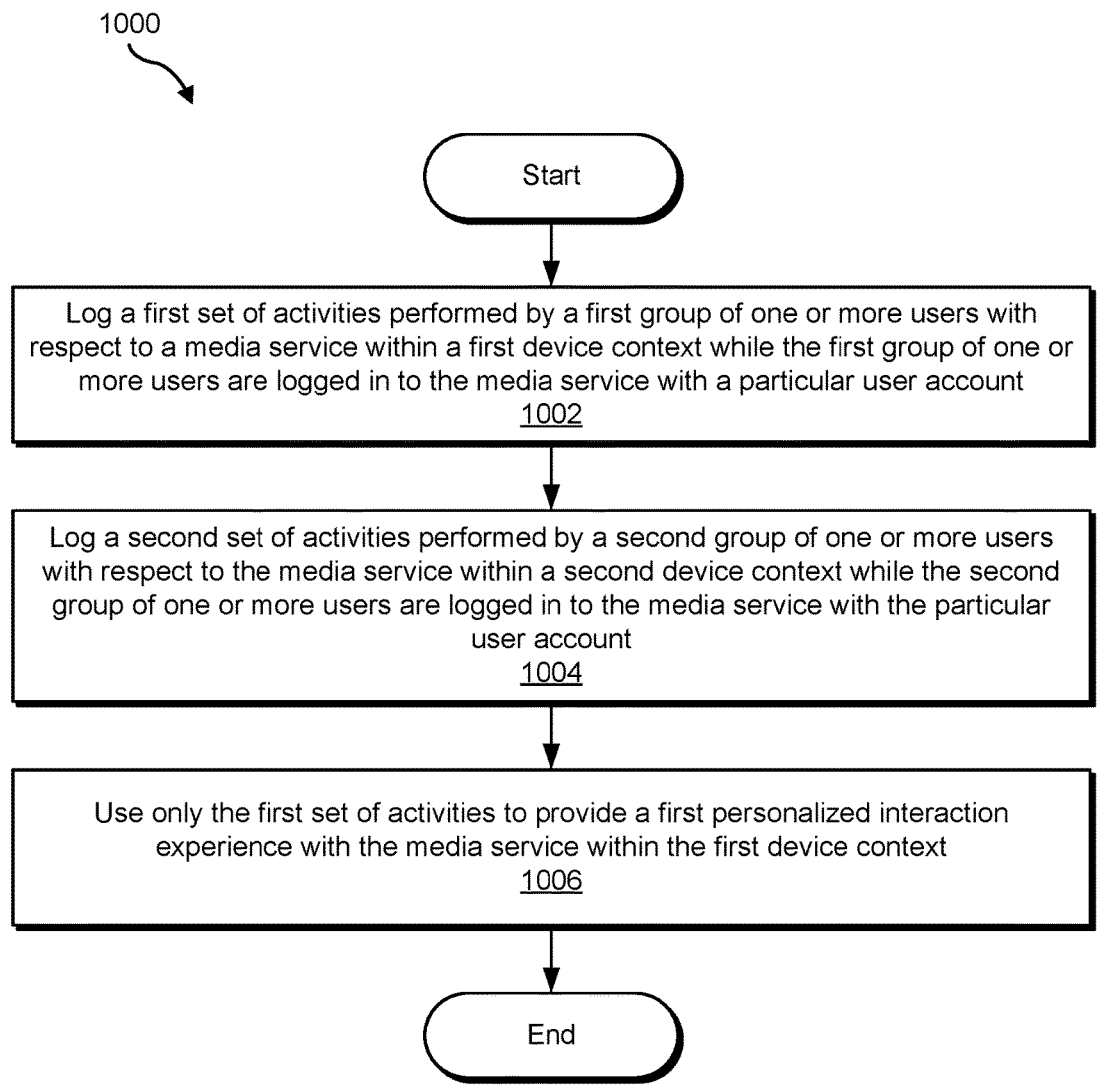
FIG. 10 illustrates an exemplary device context-based method of providing a personalized interaction experience with a media service according to principles described herein.

FIG. 10 illustrates another exemplary device context-based method 1000 of providing a personalized interaction experience with a media service. While FIG. 10 illustrates exemplary steps according to one embodiment, other embodiments may omit, add to, reorder, and/or modify any of the steps shown in FIG. 10. One or more of the steps shown in FIG. 10 may be performed by system 100 and/or any implementation thereof.

In step 1002, a media service provider system logs a first set of activities performed by a first group of one or more users with respect to a media service within a first device context while the first group of one or more users are logged in to the media service with a particular user account. Step 1002 may be performed in any of the ways described herein. For example, the media service provider system may log the first set of activities by including data representative of the activities in a local activity set associated with the first device context.

In step 1004, the media service provider system logs a second set of activities performed by a second group of one or more users with respect to the media service within a second device context while the second group of one or more users are logged in to the media service with the particular user account. Step 1004 may be performed in any of the ways described herein. For example, the media service provider system may log the second set of activities by including data representative of the activities in a local activity set associated with the second device context.

In step 1006, the media service provider system uses only the first set of activities to provide a first personalized interaction experience with the media service within the first device context. Step 1006 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known non-transitory computer-readable media.

A non-transitory computer-readable medium (also referred to as a processor-readable medium) includes any non-transitory medium that participates in providing data (e.g., instructions) that may be read by a computer (e.g., by a processor of a computer). Such a non-transitory medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of non-transitory computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other non-transitory medium from which a computer can read.

Figure 11:
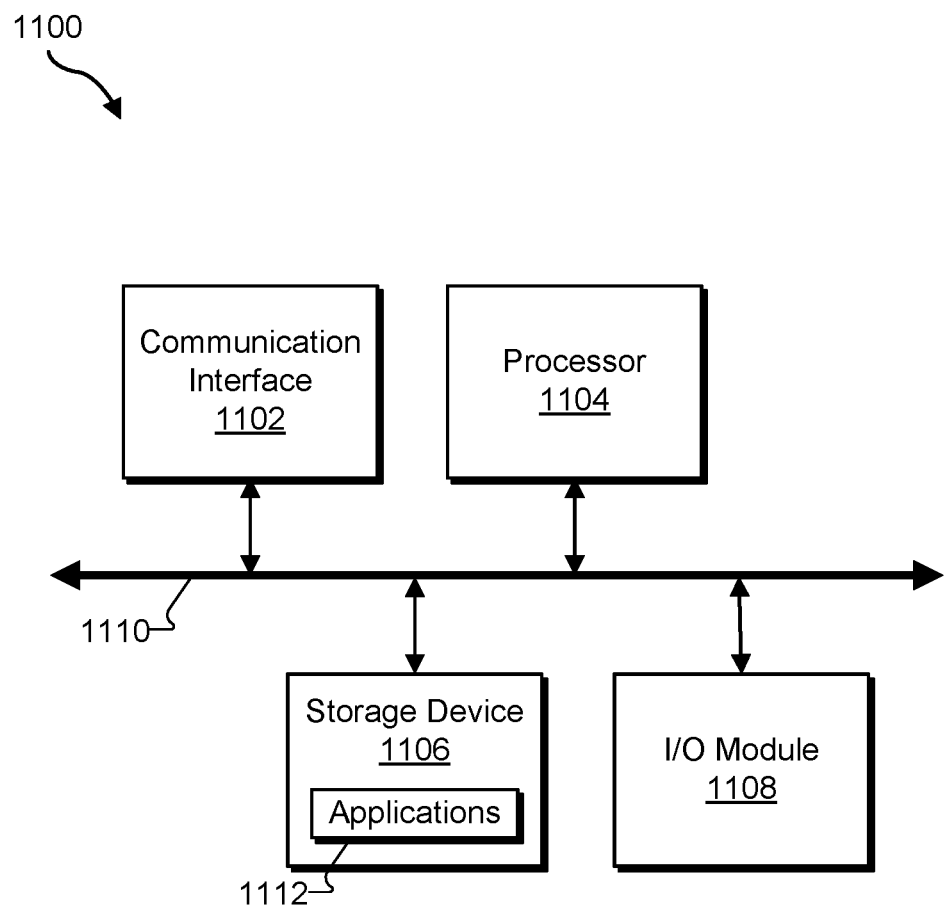
FIG. 11 illustrates an exemplary computing device according to principles described herein.

FIG. 11 illustrates an exemplary computing device 1100 that may be configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, and any other suitable interface. Communication interface 1102 may additionally or alternatively provide such a connection through, for example, a local area network (such as an Ethernet network), a personal area network, a telephone or cable network, a satellite data connection, a dedicated URL, an Internet access network, or any other suitable connection. Communication interface 1102 may be configured to interface with any suitable communication media, protocols, and formats.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another non-transitory computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1106. For example, data representative of one or more executable applications 1112 (which may include, but are not limited to, one or more of the software applications described herein) configured to direct processor 1104 to perform any of the operations described herein may be stored within storage device 1106. In some examples, data may be arranged in one or more databases residing within storage device 1106.

I/O module 1108 may be configured to receive user input and provide user output and may include any hardware, firmware, software, or combination thereof supportive of input and output capabilities. For example, I/O module 1108 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the systems and/or facilities described herein may be implemented by or within one or more components of computing device 1100. For example, one or more applications 1112 residing within storage device 1106 may be configured to direct processor 1104 to perform one or more processes or functions associated with one or more of the systems and/or facilities described herein. Likewise, any of the storage facilities described herein may be implemented by or within storage device 1106.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
    at least one physical computing device that:
        detects a first activity performed by a first user with respect to a media service while the first user is logged in to the media service with a particular user account and a second activity performed by a second user with respect to the media service while the second user is logged in to the media service with the particular user account;
        determines that the first activity is performed within a first device context and that the second activity is performed within a second device context;
        includes, based on the determination, the first activity in a local activity set associated with the first device context, the local activity set including one or more activities performed with respect to the media service exclusively in the first device context;
        uses the local activity set to provide a personalized interaction experience with the media service within the first device context.

2. The system of claim 1, wherein the at least one physical computing device:
    includes the first activity and the second activity in a shared activity set, the shared activity set including activities performed by one or more users with respect to the media service in a plurality of different device contexts while the one or more users are logged in to the media service with the particular user account; and
    uses the shared activity set to provide an additional personalized interaction experience with the media service within any of the plurality of different device contexts.

3. The system of claim 2, wherein the at least one physical computing device:
    receives user input representative of a request for the media service to operate in a shared mode within the first device context; and
    provides, in response to the request, the additional personalized interaction experience with the media service within the first device context.

4. The system of claim 3, wherein the at least one physical computing device:
    receives user input representative of a request for the media service to switch to operating in a local mode within the first device context; and
    provides, in response to the request to switch and in place of the additional personalized interaction experience, the personalized interaction experience with the media service within the first device context.

5. The system of claim 2, wherein the at least one physical computing device uses the shared activity set to provide the additional personalized interaction experience by using the activities included in the shared activity set to:
    generate one or more recommendations associated with content provided by the media service; and
    present the one or more recommendations within an interface associated with the media service to a user while the user interacts with the media service within any of the plurality of different device contexts using the particular user account.

6. The system of claim 2, wherein the at least one physical computing device:
    presents an option to a user to select one or more device contexts included in the plurality of different device contexts while the user interacts with the media service within the second device context using the particular user account;
    detects a selection by the user of the one or more device contexts; and
    uses, in response to the selection, one or more local activity sets associated with the one or more device contexts to provide the user with a third personalized interaction experience with the media service within the second device context.

7. The system of claim 1, wherein the at least one physical computing device:
    receives user input representative of a request for the media service to operate in a local mode within the first device context; and
    provides, in response to the request, the personalized interaction experience with the media service within the first device context.

8. The system of claim 1, wherein the at least one physical computing device:
    determines that the first activity is performed within the first device context by determining that the first activity is performed by the first user with a first user device; and
    determines that the second activity is performed within the second device context by determining that the second activity is performed by the second user with a second user device that is physically distinct from the first user device.

9. The system of claim 1, wherein the at least one physical computing device:
    determines that the first activity is performed within the first device context by determining that the first activity is performed by the first user with a user device while the first user is logged in to the user device with a first device-specific user account; and
    determines that the second activity is performed within the second device context by determining that the second activity is performed by the second user with the user device while the second user is logged in to the user device with a second device-specific user account that is different than the first device-specific user account.

10. The system of claim 1, wherein the at least one physical computing device uses the local activity set to provide the personalized interaction experience by using the one or more activities included in the local activity set to:
generate one or more recommendations associated with content provided by the media service; and
present the one or more recommendations within an interface associated with the media service to a user while the user interacts with the media service within the first device context using the particular user account.

11. The system of claim 1, wherein the at least one physical computing device uses the local activity set to provide the personalized interaction experience by using the one or more activities included in the local activity set to:
generate an access history representative of one or more media programs included in the media programs and accessed by way of the media service within the first device context; and
present the access history within an interface associated with the media service to a user while the user interacts with the media service within the first device context using the particular user account.

12. The system of claim 1, wherein the first activity comprises a creation of a channel within the media service, and wherein the at least one physical computing device uses the local activity set to provide the personalized interaction experience by providing a user with access to the channel while the user interacts with the media service within the first device context using the particular user account.

13. The system of claim 1, wherein the at least one physical computing device:
detects that a user is interacting with the media service within the second device context using the particular user account; and
provides, in response to the detection that the user is interacting with the media service within the second device context using the particular user account, an option for the user to access one or more features of the personalized interaction experience.

14. The system of claim 13, wherein the at least one physical computing device:
detects a selection by the user of the option; and
provides, in response to the selection of the option, the user with access to the one or more features of the personalized interaction experience.

15. The system of claim 1, wherein the particular user account is linked to a social network account provided by a social network service and associated with the second user, and wherein the at least one physical computing device:
detects that the first user is interacting with the media service within the first device context using the particular user account;
determines, in response to the detection that the first user is interacting with the media service within the first device context, that the first device context is linked to a social network account provided by the social network service and associated with the first user;
detects a request provided by the first user to share information with the social network service, the information representative of an activity performed with respect to the media service while the first user is interacting with the media service within the first device context; and
overrides, in response to the request and based on the determination that the first device context is linked to the social network account associated with the first user, the link between the particular user account and the social network account associated with the second user to share the information with the social network service using the social network account associated with the first user.

16. The system of claim 1, wherein the at least one physical computing device excludes, based on the determination, the second activity from the local activity set.

17. A system comprising:
at least one physical computing device that
logs a first set of activities performed by a first group of one or more users with respect to a media service within a first device context while the first group of one or more users are logged in to the media service with a particular user account;
logs a second set of activities performed by a second group of one or more users with respect to the media service within a second device context while the second group of one or more users are logged in to the media service with the particular user account; and
uses only the first set of activities to provide a first personalized interaction experience with the media service within the first device context.

18. The system of claim 17, wherein the at least one physical computing device uses only the second set of activities to provide a second personalized interaction experience with the media service within the second device context.

19. The system of claim 17, wherein the at least one physical computing device uses both the first and second sets of activities to provide a second personalized interaction experience with the media service within the first device context and within the second device context.

20. A method comprising:
detecting, by a media service provider system, a first activity performed by a first user with respect to a media service while the first user is logged in to the media service with a particular user account and a second activity performed by a second user with respect to the media service while the second user is logged in to the media service with the particular user account;
determining, by the media service provider system, that the first activity is performed within a first device context and that the second activity is performed within a second device context;
including, by the media service provider system based on the determining, the first activity in a local activity set associated with the first device context, the local activity set including one or more activities performed with respect to the media service exclusively in the first device context; and
using, by the media service provider system, the local activity set to provide a personalized interaction experience with the media service within the first device context.

* * * * *